Feb. 22, 1949.                J. J. O'REILLY                2,462,767
                        ACCELERATOR PEDAL AND SWITCH
                           Filed June 17, 1946
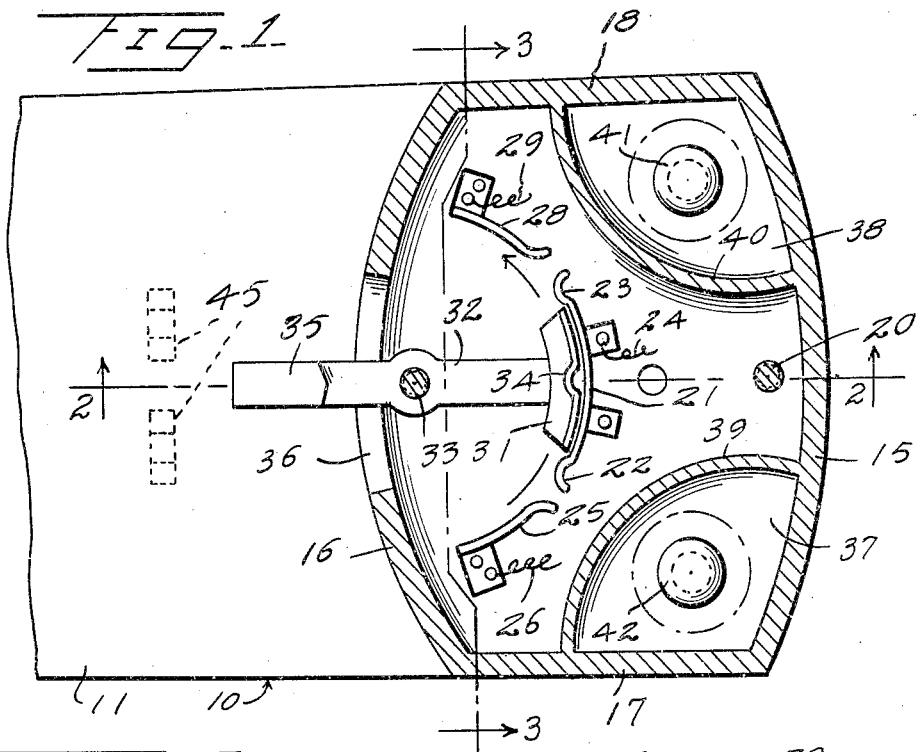
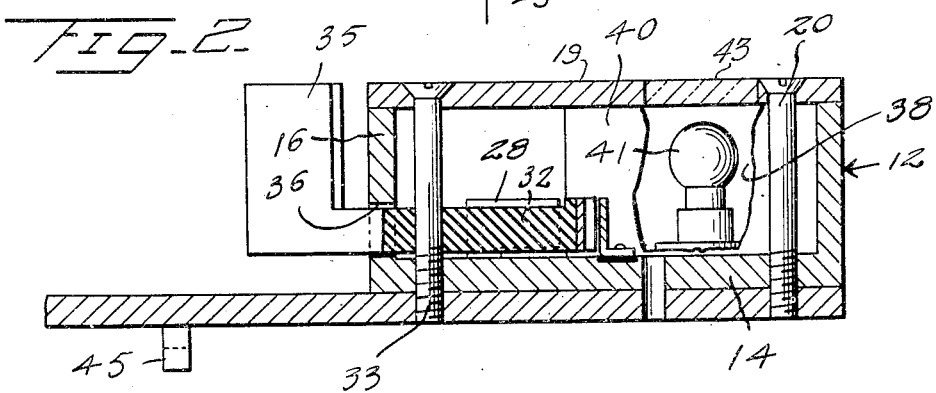
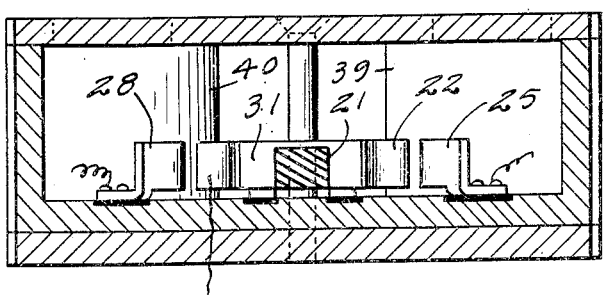
Inventor
J. J. O'Reilly
By Kimmel & Crowell
Attorneys Patented Feb. 22, 1949

2,462,767

UNITED STATES PATENT OFFICE 2,462,767

ACCELERATOR PEDAL AND SWITCH

John J. O'Reilly, Chicago, Ill.

Application June 17, 1946, Serial No. 677,154

3 Claims. (Cl. 200—59)

1

This invention relates to direction signals for motor vehicles.

An object of this invention is to provide in combination with the accelerator pedal of a motor vehicle, a switch construction mounted on the pedal and connected to right and left direction signals which is operated by the toe of the foot on the accelerator pedal.

Another object of this invention is to provide in an accelerator pedal a signal light switch which is foot operated and includes telltale or pilot lights in circuit with the signal lights so that the operator will visibly know whether the signal lights are functioning.

A further object of this invention is to provide as a new article of manufacture, a foot operated direction signal switch adapted for mounting on an accelerator pedal so that the driver of the vehicle can merely shift the toe of the foot on the pedal in the direction in which he tends to turn in order to operate the proper signals.

With the above and other objects in view, my invention consists in the arrangement, combination and details of construction disclosed in the drawings and specification, and then more particularly pointed out in the appended claims.

In the drawings, wherein similar reference characters designate similar parts throughout the respective views, Figure 1 is a fragmentary horizontal section through the forward end of a pedal and the switch, constructed according to an embodiment of my invention, Figure 2 is a sectional view taken substantially on the line 2—2 of Figure 1, Figure 3 is a sectional view taken substantially on the line 3—3 of Figure 1.

Referring to the drawings, the numeral 10 designates generally an accelerator pedal which is in the form of an elongated plate 11. The pedal 11 has fixed to the forward end thereof and on the upper side, a signal switch housing generally designated as 12.

The housing 12 includes a bottom wall 14, front and rear walls 15, 16 respectively, and opposite side walls 17, 18. The housing 12 also includes a removable top wall 19 which is secured to the housing by means of bolts or screws 20 which pass through the housing 12 and are threaded into the plate 11. The housing 12 has mounted on the bottom wall 14 thereof a central resilient contact 21. The contact 21 is of arcuate configuration and is formed with rearwardly offset end portions 22 and 23.

The contact 21 is adapted to be connected by

2 means of a conductor 24 to one side of a battery or source of electric current designated B. A second contact 25 is disposed in circumferentially spaced relation with respect to the offset end portion 22 of contact 21 and is connected by means of a conductor 26 to the rear signal lamp disposed on the left side of the vehicle.

A third arcuate contact 28 is disposed in spaced relation to the offset end 23 of contact 21 and is connected by means of a conductor 29 to a second signal lamp disposed on the right side of the vehicle. A movable circuit closing blade or contact 31 is carried by a lever arm 32 pivoted on a pivot 33. The movable contact 31 includes an intermediate offset portion 34 for engagement with either offset portion 22 or 23 so as to thereby lock contact 31 in adjusted position either in engagement with contact 25 and contact 21 or in engagement with contact 28 and contact 21.

The detent or offset portion 34 is adapted to engage either offset portion 22 or 23 and thereby lock the movable contact in selected position. The length of this contact 31 is such that when this contact is in circuit breaking position it will be disposed between the two offset portions 22, 23 as shown in Figure 1.

An operating button or arm 35 is carried by the rear end of the lever or arm 32, the latter arm projecting through an elongated slot 36 which is formed in the curved rear wall 16. The arm or button 35 is adapted to be engaged by the toe of a shoe for shifting the movable contact member 31 either into circuit closing position in a bridging position between the center contact 21 and either contact 25 or 28, or in a neutral circuit breaking position between the two outer contacts 25, 28.

The housing 12 is formed with a pair of pilot light chambers 37, 38. These chambers are formed by mounting a pair of arcuate walls 39, 40 across the front corners of the housing 12 between the side wall 17 and the front wall 15, and the side wall 18 and the side wall 15. A pilot lamp 41 is disposed in the pilot chamber 38 and is interposed in the conductor 26, being in series with the left signal lamp so that if the latter lamp burns out pilot light 41 will not be lighted.

A second pilot light 42 is mounted in the pilot chamber 37 and is also interposed in the conductor 29 so that when the right signal lamp burns out pilot light 42 will fail to light. In this manner the operator of the vehicle will be able to determine whether either one of the signal lights is lighted when the switch is shifted to the desired circuit closing position.

In the use and operation of this device, the switch housing 12 is mounted on the forward end of the accelerator pedal 10 on the upper side thereof, and the contacts 21, 25, and 28 are connected to the proper signal lights. When the operator of the vehicle is about to make a turn, the foot engaging on the top of pedal 10 may be shifted to the right so as to thereby swing the switch operator 35 to the right, as viewed in Figure 1. This operation moves the movable contact 31 into bridging engagement between contact 21 and contact 28. At this time the left signal lamp will be lighted and at the same time pilot light 41 will be lighted. This latter light will be viewed through a transparent window or panel 43 which is carried by the top wall 19. If the driver is to make a right turn, the operator 35 is swung to the left so as to close the circuit between contacts 21 and 25. This will close the electric circuit to the right signal lamp, and at the same time pilot light 42 which can be viewed through transparent panel 44 will light up.

With a signal operator switch as hereinbefore described, the operator of the vehicle will not be required to take a hand from the wheel in giving the proper signal, as the operator can readily shift the toe of the foot on the accelerator in the proper direction to effect closing of the desired electric circuit. It will be understood that normally one side of the battery will be grounded as the conventional practice.

I do not mean to confine myself to the exact details of construction herein disclosed, but claim all variations falling within the purview of the appended claims.

What I desire to claim is:

1. A switch structure for mounting on an accelerator pedal comprising a housing formed of a bottom wall, opposite side walls, front and rear walls and a removable top wall, a central upstanding arcuate contact fixed in said housing, offset end portions carried by said contact extending from the concave side of said contact, a pair of arcuate contacts spaced from the ends of said central contact, a bridging contact disposed on the concave side of said central contact, a switch arm fixed to said bridging contact and pivotally carried by said housing, said bridging contact having a length such that it will be disposed between said offset end portions of said central contact when said bridging contact is in circuit breaking position, and an offset intermediate portion carried by said bridging contact selectively engageable with one of said offset ends of said central contact for holding said bridging contact in circuit closing position.

2. A switch structure for mounting on an accelerator pedal comprising a housing formed of a bottom wall, opposite side walls, front and rear walls and a removable top wall, a central upstanding arcuate contact fixed in said housing, offset end portions carried by said contact extending from the concave side of said contact, a pair of arcuate contacts spaced from the ends of said central contact, a bridging contact disposed on the concave side of said central contact, a switch arm fixed to said bridging contact and pivotally carried by said housing, said bridging contact having a length such that it will be disposed between said offset end portions of said central contact when said bridging contact is in circuit breaking position, a pair of partitions in said housing forming a pair of pilot light chambers, a pilot light in each chamber, and a pair of transparent panels carried by said top wall and overlying said chambers.

3. A switch structure for mounting on an accelerator pedal comprising a housing, a central arcuate fixed contact in said housing, offset end portions carried by said contact extending from the concave side of said contact, arcuate contacts spaced from the ends of said central contact, a bridging contact on the concave side of said central contact, a switch arm on said bridging contact and pivoted in said housing, said bridging contact adapted to be disposed between said offset end portions in circuit breaking position, and an offset intermediate portion on said bridging contact selectively engageable with one of said offset ends of said central contact for holding said bridging contact in circuit closing position.

JOHN J. O'REILLY.

REFERENCES CITED

The following references are of record in the file of this patent:

UNITED STATES PATENTS

| Number | Name | Date |
| --- | --- | --- |
| 1,674,027 | Van Deventer | June 19, 1928 |
| 1,897,681 | Smoyer | Feb. 14, 1933 |
| 2,032,841 | Gerhart | Mar. 3, 1936 |
| 2,109,054 | Soreng et al. | Feb. 22, 1938 |
| 2,109,790 | Batcheller | Mar. 1, 1938 |
| 2,258,796 | O'Kelly | Oct. 14, 1941 |